United States Patent [19]

Barcza

[11] Patent Number: 5,573,378
[45] Date of Patent: Nov. 12, 1996

[54] GAS TURBINE NOSE CONE ATTACHMENT

[75] Inventor: William K. Barcza, Palm City, Fla.

[73] Assignee: United Technologies Corporation, Hartford, Conn.

[21] Appl. No.: 499,987

[22] Filed: Jul. 10, 1995

[51] Int. Cl.$^6$ .................................................. B64C 11/14
[52] U.S. Cl. ................... 416/245 R; 415/201; 411/175; 411/970
[58] Field of Search ..................... 416/245 R; 415/201, 415/118; 411/175 R, 970 R, 174

[56] References Cited

U.S. PATENT DOCUMENTS

| | | |
|---|---|---|
| 2,371,801 | 3/1945 | Chester et al. ........................... 416/245 |
| 2,394,749 | 2/1946 | Chester ..................................... 416/245 |
| 3,799,693 | 3/1974 | Hull .......................................... 415/201 |
| 4,393,650 | 7/1983 | Pool .......................................... 416/245 |

FOREIGN PATENT DOCUMENTS 451553  8/1936  United Kingdom ................... 416/245

*Primary Examiner*—Edward K. Look
*Assistant Examiner*—Mark Sgantzos
*Attorney, Agent, or Firm*—Robert E. Greenstien

[57] ABSTRACT

A nose cone on the fan of a gas turbine engine contains access holes that provide access to cap screws that hold the nose cone on the fan hub. The cap screws extend through an internal flange on the nose cone. A spring clip extends from the flange in a configuration that covers the access hole and holds the cap screw in the flange as the nose cone is installed.

10 Claims, 3 Drawing Sheets

GAS TURBINE NOSE CONE ATTACHMENT

FIELD OF THE INVENTION

This invention relates to gas turbine engines, in particular, the nose cones found on fan inlet hubs.

BACKGROUND

A removable nose cone is regularly attached to a hub in the center of the inlet of gas turbine engine, providing a smooth, aerodynamic surface covering for the hub hardware. In some engines, the nose cone rotates with the fan. In others that have multiple fan stages, the hub is part of a fan support strut assembly found in the engine inlet. The nose cone covers fan bearing supports located in the hub. In some of those engines, inlet, strut and nose cone deicing is provided by applying compressor bleed air to a plenum that surrounds the inlet. The plenum heats the inlet and supplies the hot compressor bleed through the struts to the nose cone and the hub, which are thereby also heated. Following conventional practice, screws extend through the nose cone to the hub. But a screw conceivably could back off and be sucked into the engine.

SUMMARY OF THE INVENTION

An object of the present invention is to provide a technique for attaching a nose cone to the hub of a gas turbine engine that eliminates external screws, reduces the chances that a screw can fall out during installation and during engine operation.

According to the invention, nose cone bolts are located inside the nose cone and held in place by a resilient member that also resiliently covers a bolt access hole in the nose cone. A bolt adjustment tool inserted through the access hole will, under moderate pressure, displace the resilient member, providing access to the bolt.

According to the invention, the resilient member is a spring clip and the access hole is normally covered by the spring clip, which presses against the inner wall of the nose cone. When the tool is inserted, the clip is pushed aside. The clip restricts air flow between the interior of the nose cone and the ambient.

According to one aspect of the invention, the spring clip extends from a nose cone flange to the inner wall in a configuration that not only closes off the hole when the tool is not inserted but retains the screw in a hole in the flange so that the screw cannot fall out as the nose cone is installed.

A feature of the invention is that it greatly simplifies installation of a nose cone on a gas turbine engine and allows access to a concealed bolt while preventing significant hot air loss from the nose through bolt access holes during deicing operations. Other objects, benefits and features of the invention will be apparent from the following discussion of one or more embodiments.

DESCRIPTION OF THE PREFERRED EMBODIMENTS

Figure 1:
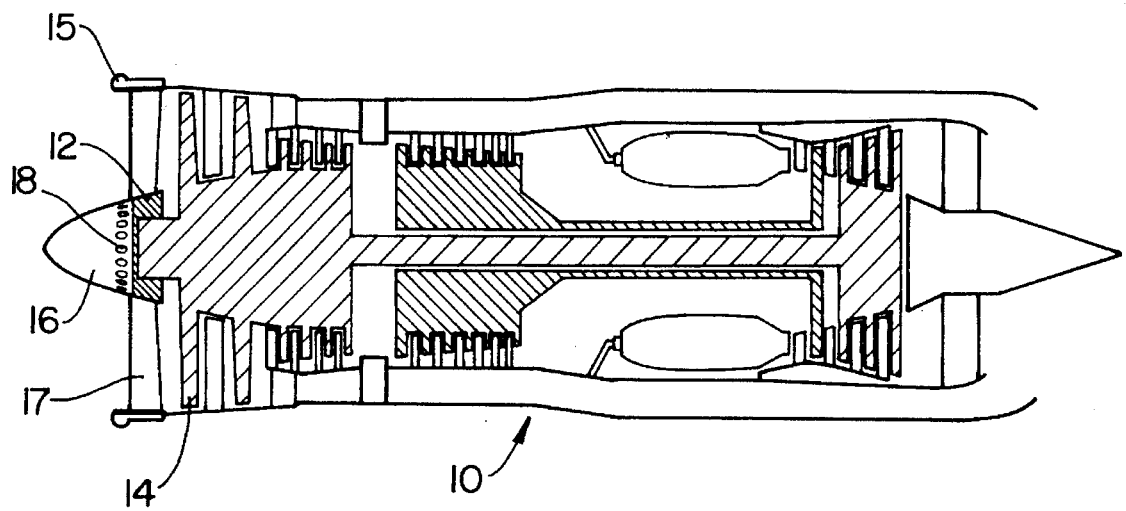
FIG. 1 is a plan view of multifan gas turbine engine having a nose cone on a strut mounted hub in the engine inlet.

Referring to FIG. 1, a gas turbine engine 10 includes a multistage fan 14 having a hub 12, and a nose cone 16, removably attached to the hub 12. Illustrating part of a typical inlet deicing system, the engine contains a compressor bleed air plenum 15 around the engine inlet. A strut 17 supports the inlet end of the fan 14 and connects the plenum to the hub 12, an arrangement that heats the outside of the inlet, the strut, the hub and the nose cone. The nose cone contains a plurality of bolt access holes 18 and a radially inwardly extending flange 22 (see FIG. 3A) with a hole 24 to receive a bolt (e.g., a cap screw) 26 that extends through another hole 27 on a radially inwardly extending flange 28 on the hub 12. The cap screw 26 is screwed into a nut 30. For simplicity, one cap screw 26 and its associated hole 24 are shown in the drawing. It should be understood that there would be a plurality of these cap screws located around the interior of the hub on the flange 22.

Figure 2:
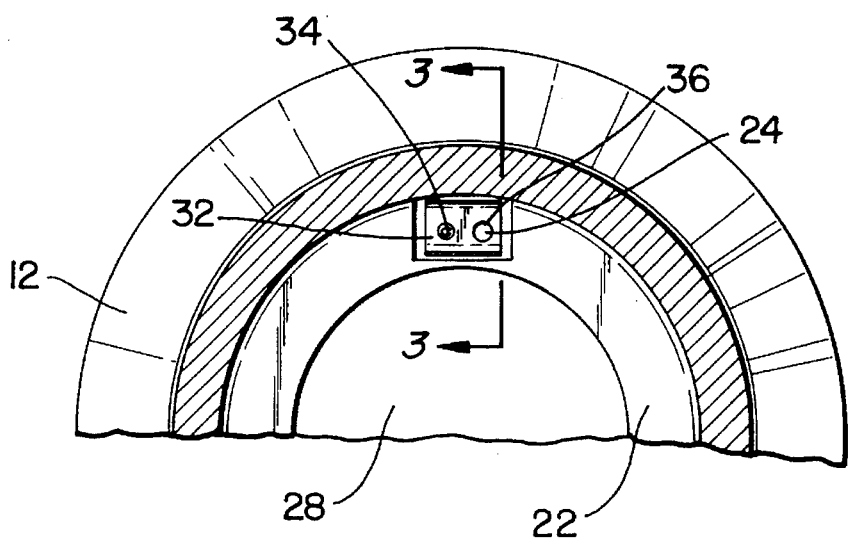
FIG. 2 is as section along line 2—2 in FIG. 3A.
Figure 3A:
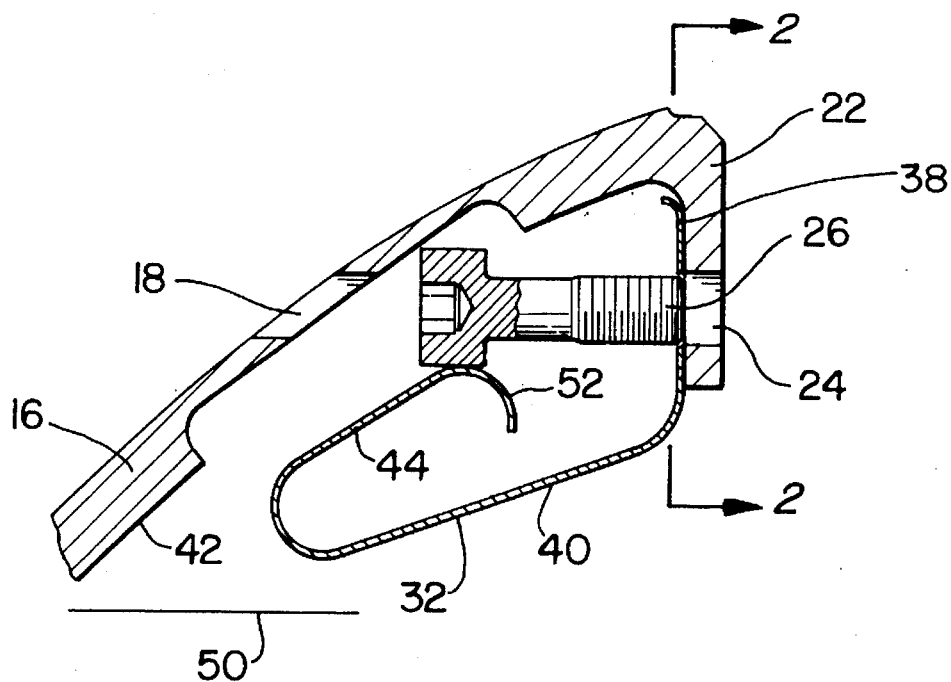
FIGS. 3A–3D are sections along line 3—3 in FIG. 2 showing different stages in the attachment of a nose cone to a hub according to the invention.
Figure 3B:
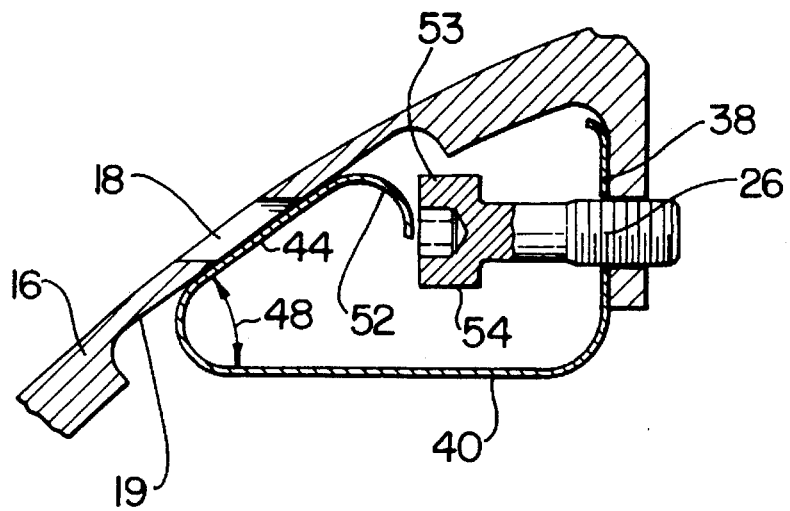
Figure 3C:
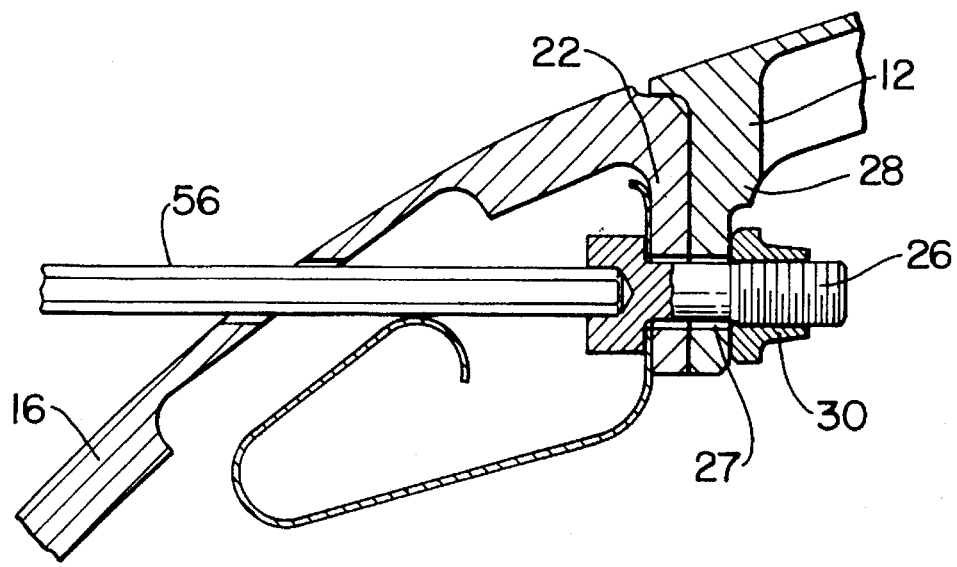
Figure 3D:
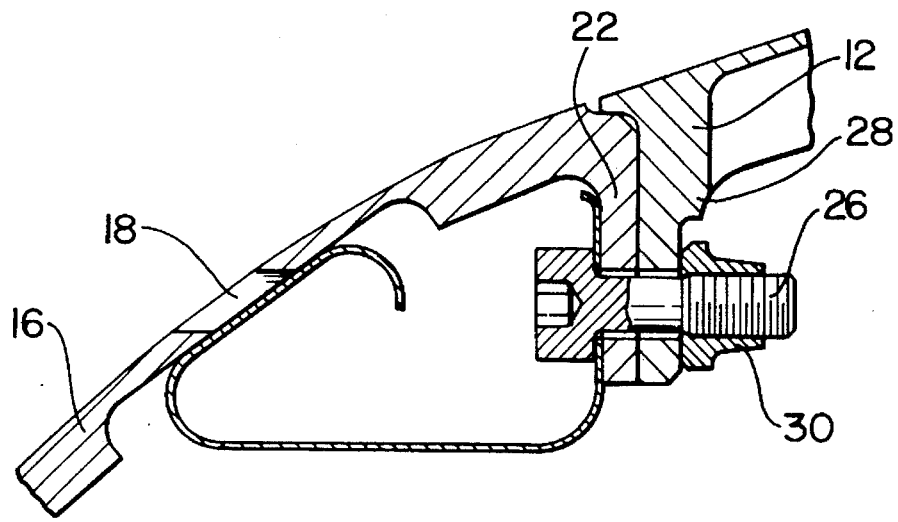

As shown in FIG. 3A, a spring clip 32 is attached by a screw or rivet 34 (see FIG. 2) to the flange 22. The spring clip 32 (made of a resilient material or spring metal) contains a first flat section 38, which rests on the flange 22, a second section 40 extends from the first section 38 towards the inner wall 42 of the nose cone 16 in the direction of axial centerline 50. A third section 44 is at an angle 48 to the second section 40, the angle 48 generally being the angle of the nose cone inner surface 42 relative to the centerline 50, which can be seen from FIG. 3B, where the third section 44 is in tension against the inner wall 19, covering the access hole 18. The third section 44 provides a surface that presses resiliently against the inner wall (surface) 19. The inner wall 19 is recessed to receive the third section 44. An end 52 of the spring clip 52 is bent towards section 40, placing it in close proximity to the cap screw head when the cap screw is loosely in the hole 24, as shown in FIG. 3B. When the cap screw is first inserted, as shown in FIG. 3A, the third section 44 is pulled towards the second section 40. The cap screw is then inserted into the hole 24. It should be understood, particularly from FIG. 3B, that the spring clip 32 prevents the cap screw 26 from completely backing out once it is installed in the hole. In practice, each cap screw would be inserted in the nose cone 16 as shown in FIG. 3B, and the nose cone then would be placed on the hub 12, as shown in FIG. 3C. A tool, such as an allen wrench is inserted through the hole 18, pushing the spring clip section 44 away. The cap screw 26 is tightened and the tool is removed. The spring clip section 44 springs back to the position shown in FIG. 3B, when the tool is removed covering the hole 18. This restricts air from entering the hub through the access hole 18 and compressor bleed air in the hub from escaping. Each cap screw on the hub would be tightened in this manner. Even though the invention has been explained in the context of a stationary nose cone in a deicer equipped engine, it can be used to attach rotating nose cones to a rotating hub on engines, an arrangement found on engines with one fan, unsupported in the inlet.

With the benefit of the previous discussion of the invention, one of ordinary skill in the art may be able to modify the invention in whole or in part without departing from its true scope and spirit.

I claim:

1. A nose cone for a gas turbine engine, comprising:

a flange on the nose cone, the flange extending radially inward from an outer surface on the nose cone;

a first hole in said flange;

a second hole in the nose cone, said second hole providing access to said first hole; and means for providing a resiliently displaceable cover for said second hole, said means being attached to said flange.

2. A nose cone according to claim 1, wherein:

said means comprises means for preventing a bolt from backing out of said first hole when said means is in a position covering said second hole.

3. A nose cone according to claim 2, wherein:

said means comprises a spring clip with a first surface that resiliently presses against an inner surface of the nose cone containing said second hole, said first surface having a section the extends towards said first hole.

4. A nose cone for a gas turbine engine, comprising:

flange means extending radially inward from the nose cone for attaching the nose cone to a hub;

a first hole in the said means for receiving a bolt;

an access hole in the nose cone to said first hole;

a surface pressing resiliently against an inner surface of the nose cone to cover said access hole, said surface being attached to said flange means.

5. A nose cone for a gas turbine engine according to claim 4, wherein:

said surface comprises means for preventing a bolt in said first hole from falling out of said first hole when said surface covers said second hole.

6. A nose cone for a gas turbine engine according to claim 5, wherein:

said surface comprises a spring clip.

7. A method of attaching a nose cone to a fan hub on a gas turbine, comprising:

pulling a spring clip away from a nose cone surface to insert a bolt in a flange on the nose cone;

releasing the spring clip to cover an access hole to the bolt in the nose cone and hold the bolt in position;

placing the nose cone on the hub;

inserting a tool through said access hole to displace said spring clip from and engage said bolt;

operating said tool to rotate said bolt; and removing said tool from said access hole.

8. A gas turbine engine having a nose cone attached to a hub in the engine inlet, comprising:

a flange on the nose cone, the flange extending radially inward from an outer surface on the nose cone;

a first hole in said flange;

a second hole in the nose cone, said second hole providing access to said first hole; and means for providing a resiliently displaceable cover for said second hole, said means being attached to said flange.

9. A gas turbine engine according to claim 8, wherein:

said means comprises means for preventing a bolt from backing out of said first hole when said means is in a position covering said second hole.

10. A gas turbine engine according to claim 2, wherein:

said means comprises a spring clip with a first surface that resiliently presses against an inner surface of the nose cone containing said second hole, said first surface having a section the extends towards said first hole.

* * * * *